US011964354B2

(12) United States Patent
Abadjiev et al.

(10) Patent No.: US 11,964,354 B2
(45) Date of Patent: Apr. 23, 2024

(54) WORKSTATION ASSEMBLY AND REMOTE COLLABORATION SYSTEM

(71) Applicants: Michael Abadjiev, Watertown, MA (US); Eric Kurz, Waltham, MA (US); Tina Barsoumian, Belmont, MA (US)

(72) Inventors: Michael Abadjiev, Watertown, MA (US); Eric Kurz, Waltham, MA (US); Tina Barsoumian, Belmont, MA (US)

(*) Notice: Subject to any disclaimer, the term of this patent is extended or adjusted under 35 U.S.C. 154(b) by 283 days.

(21) Appl. No.: 17/577,285

(22) Filed: Jan. 17, 2022

(65) Prior Publication Data

US 2022/0226954 A1   Jul. 21, 2022

Related U.S. Application Data

(60) Provisional application No. 63/138,601, filed on Jan. 18, 2021.

(51) Int. Cl.
| | |
|---|---|
| *E05D 11/10* | (2006.01) |
| *B23Q 15/013* | (2006.01) |
| *B23Q 15/22* | (2006.01) |
| *B25J 13/08* | (2006.01) |
| *G06Q 10/101* | (2023.01) |
| *G06T 7/70* | (2017.01) |

(52) U.S. Cl.
CPC ............ *B23Q 15/22* (2013.01); *B23Q 15/013* (2013.01); *B25J 13/089* (2013.01); *G06Q 10/101* (2013.01); *G06T 7/70* (2017.01)

(58) Field of Classification Search
CPC ...... B23Q 15/22; B25J 13/089; G06Q 10/101; G06T 7/70
See application file for complete search history.

(56) References Cited

U.S. PATENT DOCUMENTS

2012/0123528 A1* 5/2012 Knippel ............... A61F 2/2436
623/2.11

* cited by examiner

*Primary Examiner* — Muhammad S Islam
(74) *Attorney, Agent, or Firm* — Duquette Law Group

(57) ABSTRACT

Embodiments of the innovation relate to a workstation assembly, comprising: a frame; a carriage assembly moveably coupled to the frame, the carriage assembly having a carriage frame and an imaging device coupled to the carriage frame; and a workstation device disposed in electrical communication with the carriage assembly, the workstation device having a controller including a processor and a memory, the controller configured to: transmit an image signal of a workspace from the imaging device to a user device, receive a control signal from the remote user device, and adjust a position of the carriage assembly on the frame and relative to the workspace based upon the control signal.

20 Claims, 12 Drawing Sheets

WORKSTATION ASSEMBLY AND REMOTE COLLABORATION SYSTEM

RELATED APPLICATIONS

This patent application claims the benefit of U.S. Provisional Application No. 63/138,601, filed on Jan. 18, 2021, entitled, "Remote Collaboration System," the contents and teachings of which are hereby incorporated by reference in their entirety.

BACKGROUND

Teleconferencing solutions for remote working and online learning have become more and more popular in recent years, particularly since the start of the global COVID-19 pandemic. Conventional teleconferencing solutions allow users at geographically remote locations to collaborate on projects. For example, a team at a first location can use a conventional collaboration platform, such as Zoom and Microsoft Teams, to interact with a team at a second, remote location.

While conventional collaboration platforms can be utilized to provide a variety of types of collaborations, in one arrangement, the platforms are utilized for collaboration during a product design or manufacturing process. For example, users at a first location can use the collaboration platform to view a physical workpiece under development at a second location and to provide feedback regarding the design process.

SUMMARY

While conventional platforms allow for remote collaboration, these platforms can suffer from a variety of deficiencies. For example, conventional platforms are lacking when it comes to collaborating on hardware systems as they fail to address the unique problems of hardware-focused work, such as detailed circuit boards and small mechanical devices.

For example, Applications like Zoom and Microsoft Teams are held back by their reliance on traditional webcams, which lack the high-resolution, focus distance, and stability to share minute details when collaborating with remote users. Poor webcam arrangements and resolution lead to an inability to see details, and the remote environment limits user interaction, with no way for remote participants to indicate precisely what part of a device they are referring to. In addition, feedback from remote users can be difficult to interpret and understand, due to difficulties pointing out specific areas of focus. These issues are equally significant in the field of technology education, where educators struggle to convey subject matter or help students troubleshoot assignments.

Conventional platforms can also create a time lag between the teams at the first and second remote locations which can interfere with real time interaction. Additionally, conventional platforms, such as that produced by LabsLand, provide the ability for teams to interact on a project remotely and in substantially real time. However, the LabsLand platform is related to specific hardware teaching and labs developed by the company and is not configured to provide interaction between teams on a user-defined project.

By contrast to conventional collaboration platforms, embodiments of the present innovation relate to a workstation assembly and remote collaboration system. In one arrangement, the remote collaboration system includes a workstation assembly having a frame and a carriage assembly having one or more remote-controlled imaging devices and identification or pointing devices. Remote users can electrically couple to the workstation assembly via a network such as a wideband area network, and can manipulate the position of the imaging and identification devices relative to a workpiece. Manipulation of the imaging device allows the remote user to view the workpiece from a variety of angles while manipulation of the identification device allows the remote user to identify areas of interest on the workpiece. Accordingly, the remote collaboration system allows users who are located in remote geographic locations to collaborate with each other regarding the workpiece.

In one arrangement, the frame is coupled to a base and includes the carriage assembly as a gear-driven carriage frame configured to support the imaging and identification devices. As the user remotely adjusts the rotational position of the carriage assembly relative to the frame, the imaging and identification devices rotate on the frame in an arc relative to the base and a workpiece, to provide an image of the workpiece in a variety of views. The frame can be configured in a variety of shapes. For example, the frame can be configured as an arc-shaped frame configured to rotate the carriage assembly relative to the workpiece. In another example, the gantry can be configured as a rectangular-shaped frame configured to linearly translate the carriage assembly relative to the workpiece.

The frame can be secured to the base in a variety of ways. In one arrangement, the frame is configured to remain stationary relative to the base. In another arrangement, the frame is configured to rotate relative to the base in response to electrical commands provided by the remote user to provide additional images of the workpiece.

The imaging device can be configured as a digital microscope and high-definition webcam which can work in parallel to display an overview and detailed view of the workpiece. The webcam can provide a perspective view of a large work area, while the microscope can focus on fine details of the workpiece, such as individual wires and their connections on a breadboard. In one arrangement, the imaging devices can be coupled to the gear-driven mounting element via a gimbal, the positioning of which can be controlled by the remote user via electrical commands.

The identification or pointing device can be configured as a light emitting device, such as a laser diode, for pointing out details on the workpiece. Additionally, to point out large areas of interest, the identification device can also include a spotlight device, such as an LED spotlight. In one arrangement, the identification devices can be coupled to the gear-driven mounting element via a gimbal, such as a two-axis gimbal, the positioning of which can be controlled by the remote user via electrical commands.

Embodiments of the innovation relate to a workstation assembly, comprising: a frame; a carriage assembly moveably coupled to the frame, the carriage assembly having a carriage frame and an imaging device coupled to the carriage frame; and a workstation device disposed in electrical communication with the carriage assembly, the workstation device having a controller including a processor and a memory, the controller configured to: transmit an image signal of a workspace from the imaging device to a user device, receive a control signal from the remote user device, and adjust a position of the carriage assembly on the frame and relative to the workspace based upon the control signal.

Embodiments of the innovation relate to a collaboration system, comprising: a remote user device having a processor and a memory; and a workstation assembly disposed in electrical communication with the remote user device. The workstation assembly comprises: a frame; a carriage assembly moveably coupled to the frame, the carriage assembly having a carriage frame and an imaging device coupled to the carriage frame; and a workstation device disposed in electrical communication with the carriage assembly, the workstation device having a controller including a processor and a memory, the controller configured to: transmit an image signal of a workspace from the imaging device to a user device, receive a control signal from the remote user device, and adjust a position of the carriage assembly on the frame and relative to the workspace based upon the control signal.

BRIEF DESCRIPTION OF THE DRAWINGS

The foregoing and other objects, features and advantages will be apparent from the following description of particular embodiments of the innovation, as illustrated in the accompanying drawings in which like reference characters refer to the same parts throughout the different views. The drawings are not necessarily to scale, emphasis instead being placed upon illustrating the principles of various embodiments of the innovation.

DETAILED DESCRIPTION

Embodiments of the present innovation relate to a workstation assembly and remote collaboration system. In one arrangement, the remote collaboration system includes a workstation assembly having a frame and a carriage assembly having one or more remote-controlled imaging devices and identification or pointing devices. Remote users can electrically couple to the workstation assembly via a network such as a wide area network, and can manipulate the position of the imaging and identification devices relative to a workpiece. Manipulation of the imaging device allows the remote user to view the workpiece from a variety of angles while manipulation of the identification device allows the remote user to identify areas of interest on the workpiece. Accordingly, the remote collaboration system allows users who are located in remote geographic locations to collaborate with each other regarding the workpiece.

Figure 1:
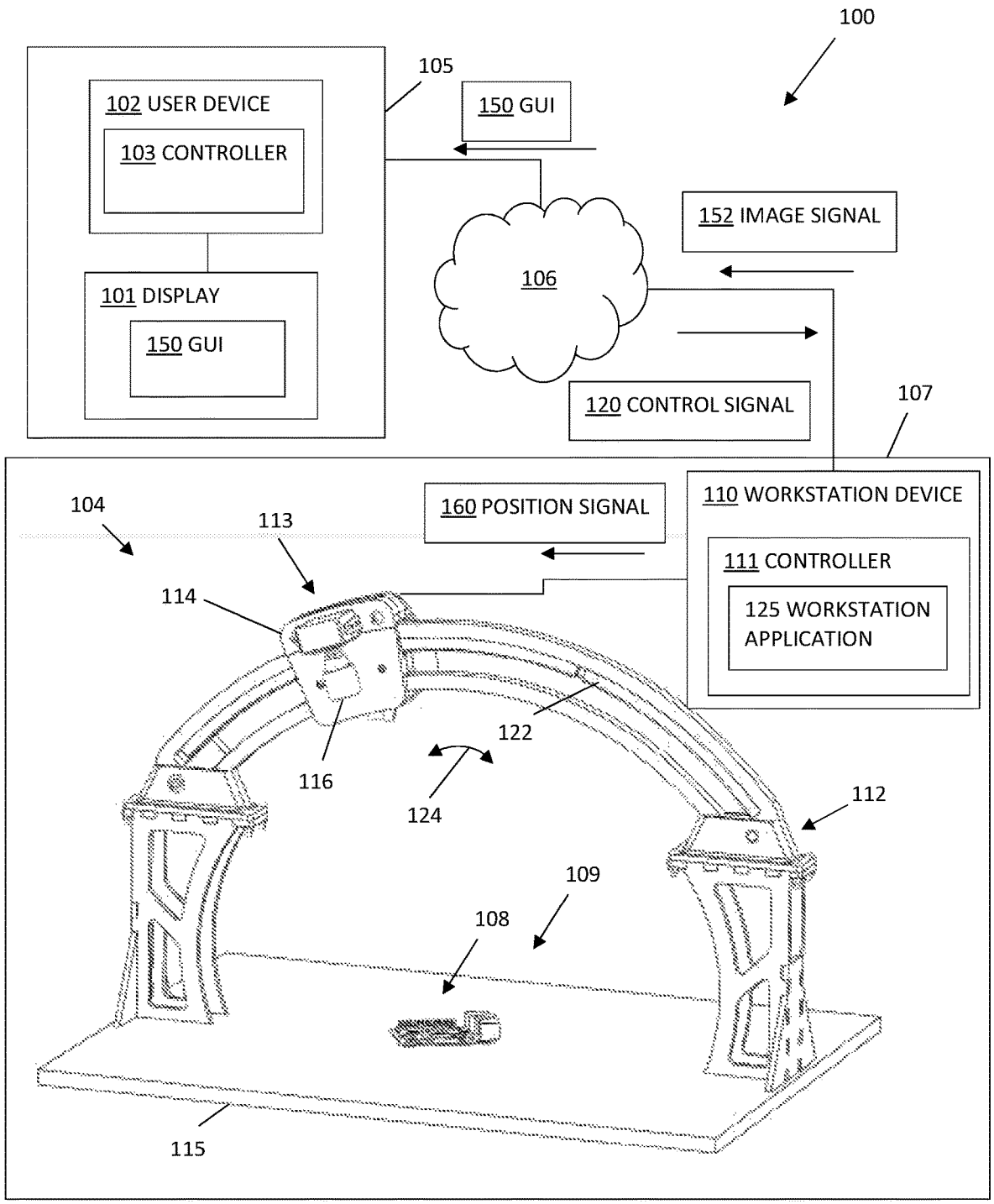
FIG. 1 illustrates a schematic representation of a collaboration system, according to one arrangement.

FIG. 1 illustrates a schematic representation of a collaboration system 100, according to one arrangement. The collaboration system 100 can include a user device 102 disposed in electrical communication with a workstation assembly 104.

The user device 102 can be a computerized device having a controller 103, such as a processor and memory, which is configured to provide user interaction with the workstation assembly 104 and workpiece 108 at a geographically remote location. For example, users, such as product developers, can be located at a first physical location 105 which is geographically distinct or remote relative to a second physical location 107 of the product or workpiece 108 under development. The user device 102 allows the user to control the workstation assembly 104 from the first physical location 105 in order to view and interact with the workpiece 108 during the development process. As such, the user can provide feedback regarding the development of the workpiece 108 in substantially real time and can collaborate with product developers, such as those working at the remote second physical location 107 of the workpiece 108.

The workstation assembly 104 is configured to allow the user of the user device 102 to engage with the workpiece 108, such as during a development process. For example, the workstation device 108 can include a workstation device 110 having a controller 111 (e.g., a processor and memory) disposed in electrical communication with the user device 102 via a network 106, such as a wide area network (WAN). The workstation device 110 can be configured in a variety of ways. For example, the workstation device 110 can include a personal computer, such as a tablet or laptop device, which connects to various components of the workstation assembly 104 via an Arduino Nano through a serial port. In another example, the workstation device 110 is configured to interface or connect with the various components of the workstation assemble 104 directly.

In one arrangement, the workstation device 110 is configured to execute a workstation application 125 to generate a graphical user interface (GUI) which can be provided to the user device 102 via the network 106. For example, the workstation device 110 can be configured to interface with the user device 102 through the network 106 using a collaboration application, such as Zoom. As will be described below, following the establishment of a collaboration session between the user device 102 and the workstation device 110, the workstation device 110 can provide the GUI to the user device 102 to allow the user device 102 to remotely control operational aspects of the workstation assembly 104 via the GUI in substantially real time.

The workstation assembly 104 can include a variety components. For example, the workstation assembly 104 can include a frame 112 coupled to a base 115 and a carriage assembly 113 moveably coupled to the frame 112. The carriage assembly 113 can include a carriage frame 114 and an imaging device 116 coupled to the carriage frame 114 to allow a user at the first physical location 105 to view and interact with the workpiece 108 at the remote second physical location 107.

Figure 2:
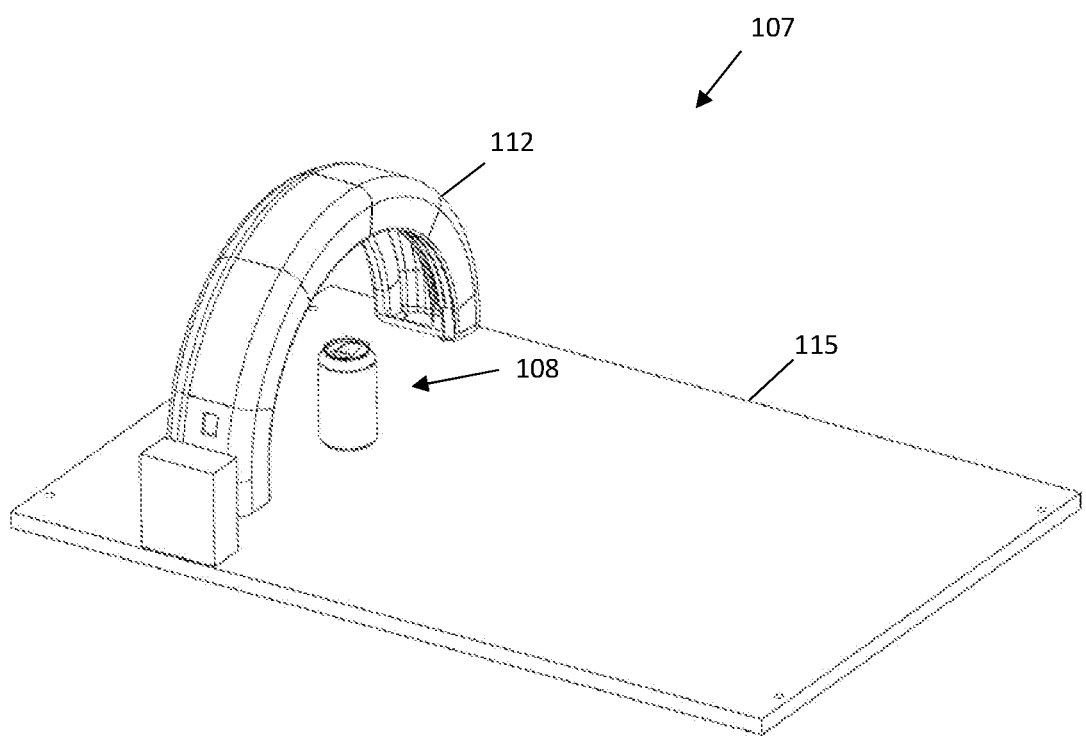
FIG. 2 illustrates a schematic representation of a collaboration system, according to one arrangement.

The frame 112 is configured to direct the positioning of the carriage assembly 113 relative to the workpiece 108. As such, the frame 112 can be configured in a variety of geometries. In one arrangement, as illustrated in FIG. 1, the frame 112 can be configured as an arc-shaped structure to direct the carriage assembly 113 along an arc-shaped path relative to the workpiece 108. For example, the arc-shaped structure can be configures to direct the carriage assembly 113 along a path that forms an angle of between about 90° and 150° relative to the workpiece 108 and within the plane of the frame 112. In one arrangement, as illustrated in FIG. 2, the frame 112 can be configured as a semi-circular structure to direct the carriage assembly 113 along a path that forms an angle of about 180° relative to the workpiece 108 and within a plane defined by the frame 112.

The carriage assembly 113 is configured to allow a remote user to change the physical orientation of the imaging device 116 relative to the frame 112 in order to manipulate their viewpoint of the workpiece 108 and to provide an improved understanding of the subject matter. For example, various components of the carriage assembly 113, such as the imaging device 116 and a drive motor (not shown), can be disposed in electrical communication with the workstation device 110. As such, the user device 102 to remotely control the components of the workstation assembly 104 via the GUI provided by the workstation device 110.

The carriage assembly 112 can be moveably coupled to the frame 112 in a variety of ways. In one arrangement, as illustrated in FIG. 1, the carriage assembly 113 can be moveably coupled to the frame 112 via a gear track 122. For example, the carriage frame 114 can include a stepper motor connected to a planet gear (not shown) which meshes with the gear track 122. Actuation of the stepper motor causes the planet gear to rotate relative to the gear track 122. Such interaction of the planet gear with the gear track 122 causes the carriage assembly 113 to rotate on the frame 112 along direction 124.

Figure 3:
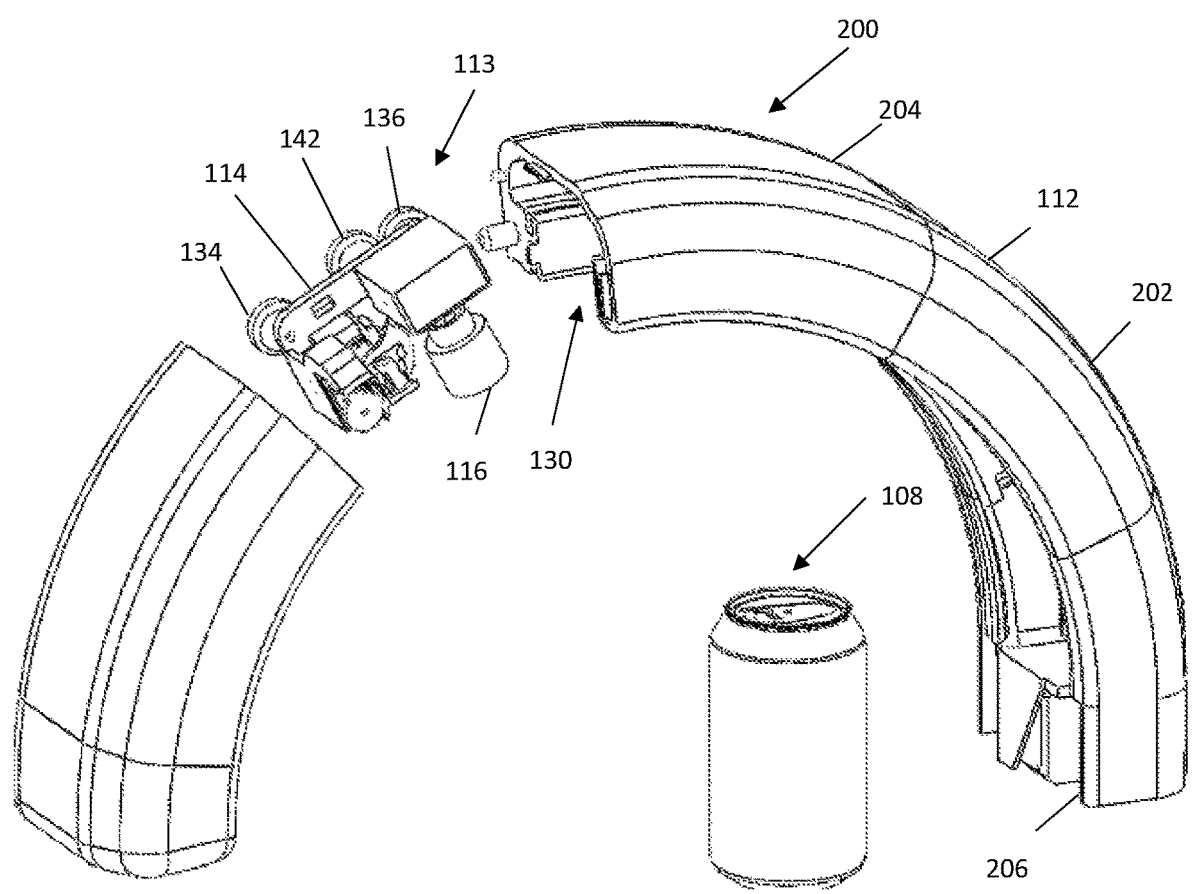
FIG. 3 illustrates a partial cutaway view of a schematic representation of the workstation assembly of FIG. 2, according to one arrangement.

In one arrangement, as illustrated in FIG. 3, the carriage assembly 113 can be moveably coupled within a channel 130 defined by the frame 112. For example, with additional reference to FIGS. 4 and 5, the carriage frame 114 can include a set of wheels 134 rotatably coupled thereto and disposed in operative communication with a drive motor (not shown). While the set of wheels 134 can be configured in a variety of ways, in one arrangement, the set of wheels 134 includes first and second wheels 136, 138 disposed on the carriage frame 114 and aligned along a first longitudinal axis 140 and a third wheel 142 disposed on the carriage frame 114 along a second longitudinal axis 144 which is offset by a distance from the first longitudinal axis 140.

Figure 5:
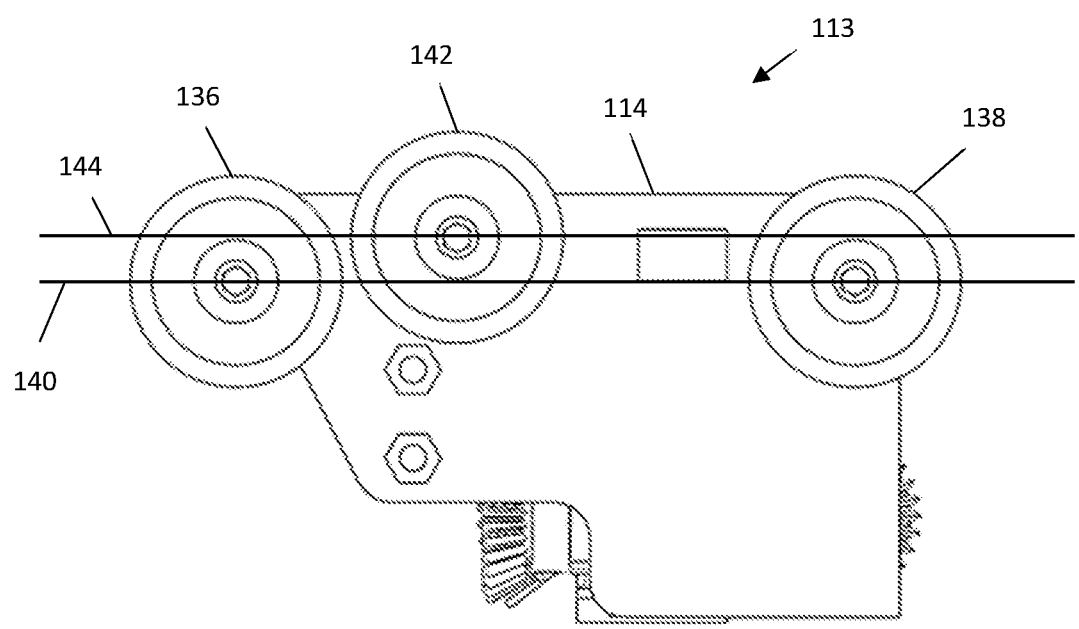
FIG. 5 illustrates a side view of the schematic representation of the carriage assembly of FIG. 3, according to one arrangement.
Figure 6:
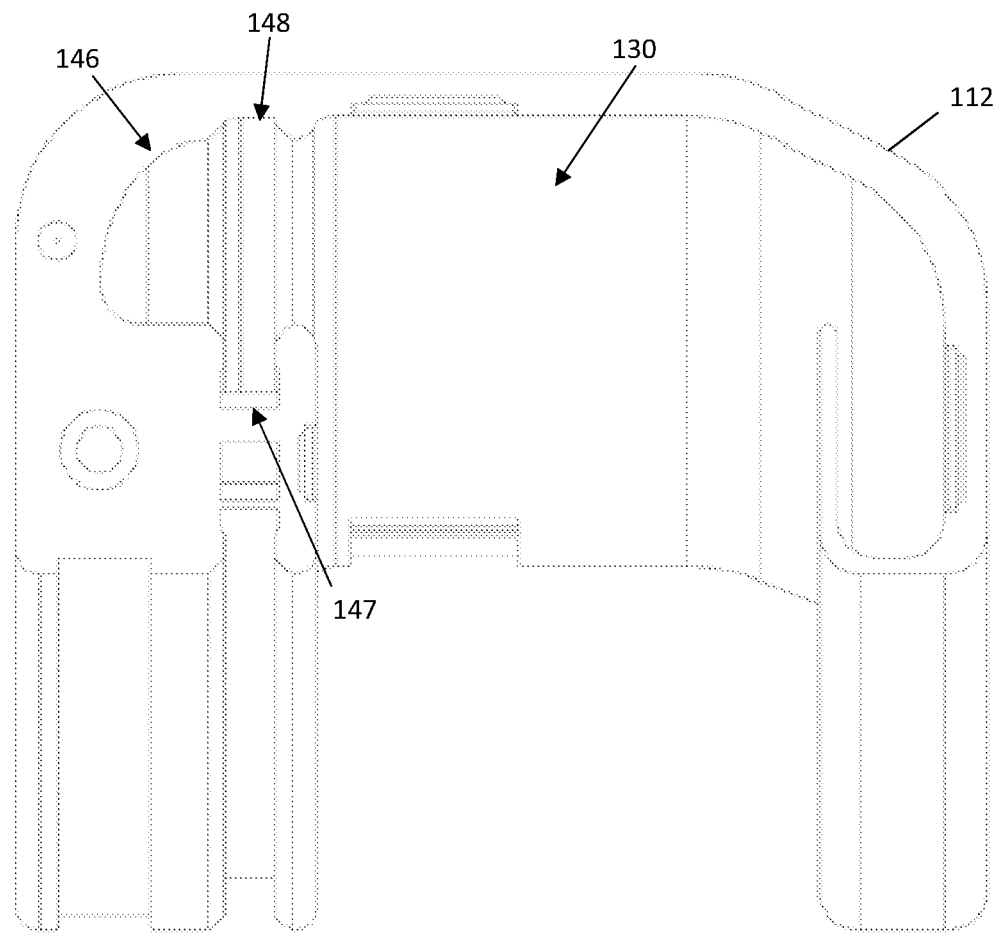
FIG. 6 illustrates a sectional view of the frame of the workstation assembly of FIG. 2, according to one arrangement.

With additional reference to FIG. 5, when the carriage assembly 113 is disposed within the channel 130 defined by the frame 112, the set of wheels 134 ride within a channel portion 146 defined by the frame 112. For example, the first and second wheels 136, 138 of the carriage assembly 113 contact a first or lower wall 147 of the channel portion 146 while the third wheel 142 contacts a second or upper wall 148 of the channel portion 146. As such, the walls 147, 148 of the channel portion 146 can compress respective wheels 136, 138, 142 towards the carriage frame 114. Such compression can maintain the carriage assembly 113 in a centered position relative to the frame 112 which can, in turn, mitigate binding or twisting of the carriage assembly 113 within the frame 112 during operation.

Returning to FIG. 1 and as provided above, the carriage assembly 113 can include an imaging device 116 coupled to the carriage 114. The imaging device 116 can be configured in a variety of ways. In one arrangement, the imaging device 116 can include a microscope component, such as a digital microscope, and a video camera component, such as a high-definition webcam. The microscope and video camera components are configured to work in parallel with each other to display a detailed view and an overview, respectively, of the workpiece 108. For example, the microscope component can focus on relatively fine details of a workpiece 108, such as individual wires and their connections on a breadboard, while the video camera component can provide a perspective view of a relatively large work area which includes the workpiece 108.

During operation of the collaboration system 100, a remote user located at the first physical location 105 can utilize the user device 102 to access and remotely control operational aspects of the workstation assembly 104 via the network 106. For example, the user device 102 can transmit a login request to the workstation device 110 over the network 106 using a collaboration application, such as Zoom. In response to confirming the login request, the workstation device 110 can execute the workstation application 125 to generate the GUI 150. The workstation device 110 can then forward the GUI 150 to the user device 102 and provide the user device 102 with remote control of the workstation assembly 104 through the GUI 150. As such, the user device 102 can access the workstation assembly 104 from the first physical location 105 and can communicate (e.g., provide audio and video information) with the users at the second physical location 107 through execution of the collaboration application. For example, the user device 102 can provide the GUI 150 to a display 101 where the GUI 150 identifies the various components associated with the carriage assembly 113 and provides the remote user with the ability to access and control aspects of the workstation assembly 104 and carriage assembly 113 via the user device 102. Further, the remote user at location 105 can also provide audio and imaging feedback to the users at location 107 via the user device 102.

After forwarding of the GUI 150 to the user device 102, the workstation device 110 can provide an image signal 152 of a workspace 109 associated with the workpiece 108 to the user device 102. For example, the workstation device 110 can receive an image of the workspace 109 via the imaging device 116 and transmits the image as the image signal 152 to the user device 102 for display. The user of the user device 102 at the first physical location 105 can review the image associated with the image signal 102 via the display 101 and can cause the workstation assembly 104 to adjust the position of the imaging device 116 to obtain an improved image of the workspace 109 and workpiece 108, as needed. For example, assume the case where the image signal 152 fails to provide the view of a portion of the workpiece 108 which the remote user wants to investigate. In such a case, the user can utilize the GUI 150 to generate and transmit a control signal 120 from the user device 102 to the workstation device 110 to adjust the relative position of the carriage assembly 113.

In response to receiving the control signal 120, the workstation device 110 is configured to adjust a position of the carriage assembly 113 on the frame 112 and relative to the workspace 109. For example, based upon the control signal 120, the workstation device 110 can generate and transmit a position signal 160 to the carriage assembly 113. The position signal 160 can activate and drive the associated motor and cause the carriage assembly 113 to translate along the frame 112 to adjust the position of the imaging device 116 to a desired location. Based upon subsequent image signals 152 provided by the imaging device 116 to the user device 102, the user at the first physical location 105 can continue to provide additional control signals 120 to the workstation device 110 via the GUI 150 to adjust the carriage assembly 113 position and to obtain additional views of the workspace 109 and workpiece 108.

In one arrangement, the control signal 120 can adjust the focus of the imaging device 116. For example, assume the case where the image signal 152 provides a view of the workpiece 108 which is blurry or out-of-focus. The remote user at the location 105 can utilize the GUI 150 to generate and transmit the control signal 120 from the user device 102 to the workstation device 110 to cause the workstation device 110 to adjust the positioning of one or more lenses of the imaging device 116. Based upon subsequent image signals 152 provided by the imaging device 116 to the user device 102, the user at the first physical location 105 can continue to provide additional control signals 120 to the workstation device 110 via the GUI 150 to adjust the focus of the imaging device 116 until the desired image of the workpiece 108 is attained.

As provided above, the carriage assembly 113 includes an imaging device 116 to provide the user at the first location 107 with visual feedback regarding the workpiece 108. In one arrangement, the carriage assembly 113 can include additional elements to assist with the remote user's interaction with the workpiece 108.

Figure 4:
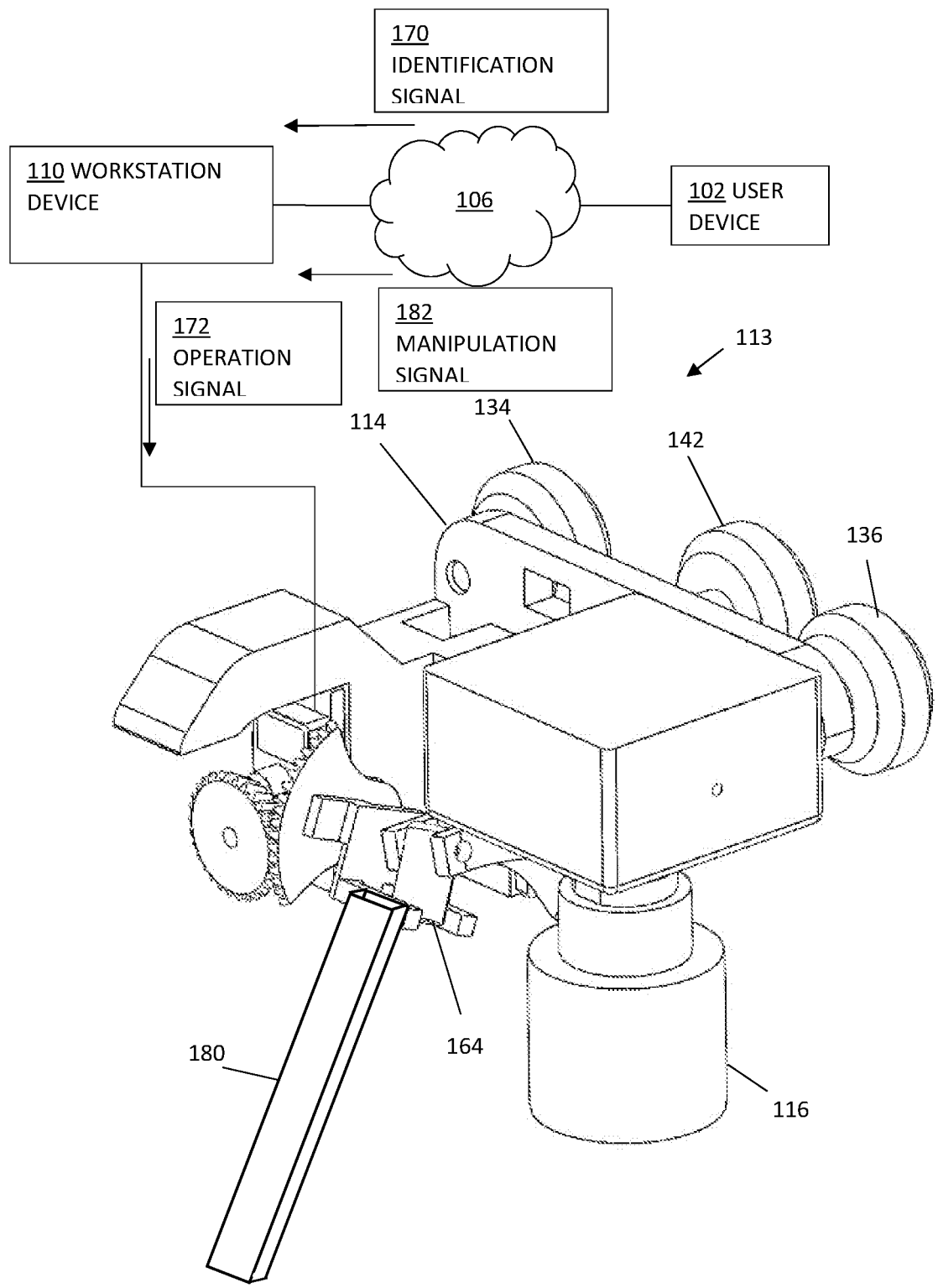
FIG. 4 illustrates a perspective view of a schematic representation of a carriage assembly of the workstation assembly of FIG. 3, according to one arrangement.

For example, with reference to FIG. 4, the carriage assembly 113 can include an identification device 160 configured to point out or identify one or more locations or areas of the workpiece 108, such as an area of interest to the remote user. The identification device 160 is disposed in electrical communication with the workstation device 110 and, as such, can be controlled remotely by the user device 102 via GUI 150.

Figure 7:
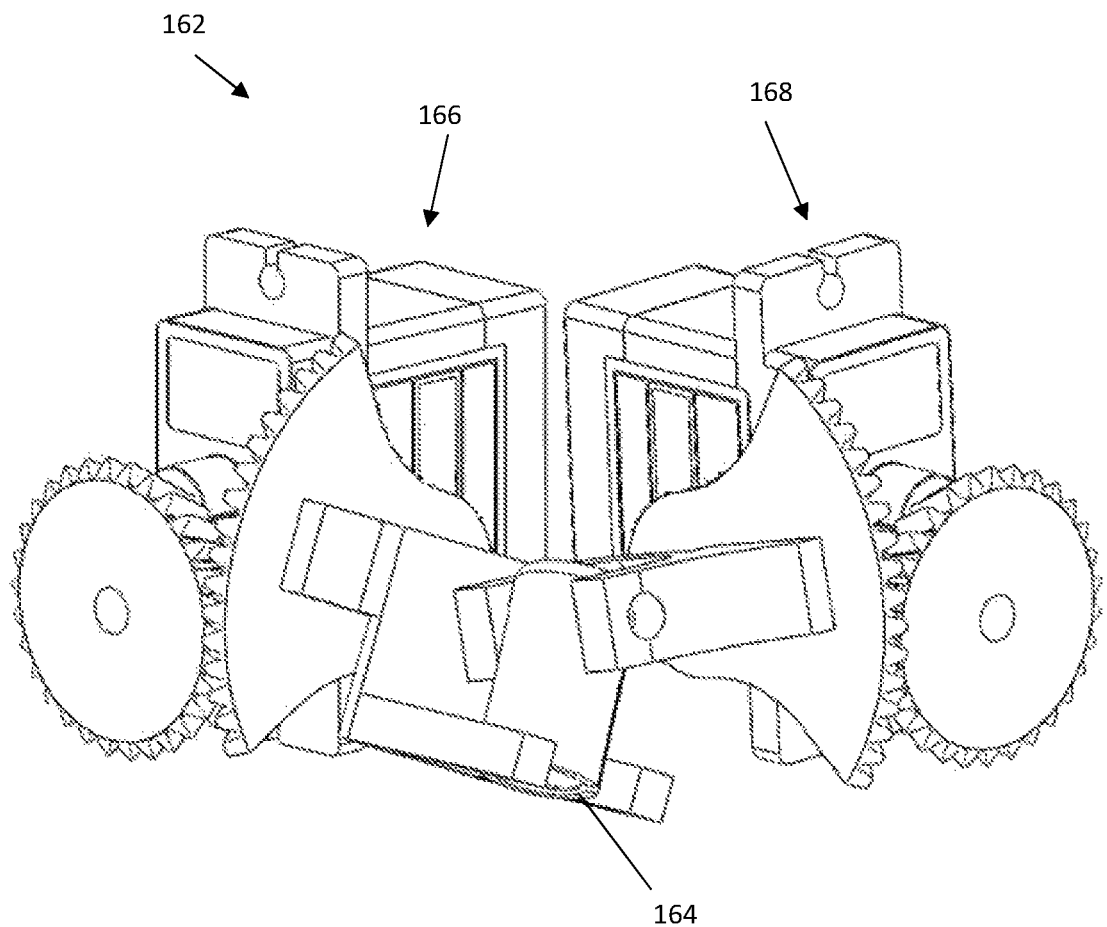
FIG. 7 illustrates a schematic representation of a gimbal of an identification device, according to one arrangement.

In one arrangement, the identification device 160 includes a gimbal 162 coupled to the frame 114 and a light source 164 coupled to the gimbal 162. As shown in FIG. 7, the gimbal 162 can configured as a two-axis gimbal having a first gimbal assembly 166 and a second gimbal assembly 168. During operation, the workstation device 110 is configured to provide signals from the user device 102 to drive the gimbal assemblies 166, 168 to adjust the position of the light source 164 along two separate axes. Returning to FIG. 4, the light source 164 can be configured in a number of ways. For example, the light source 164 can be configured as a laser pointer to identify relatively fine details on the workpiece 108 or as a light emitting diode (LED) to identify a relatively large areas or locations of interest on the workpiece 108. In another example, the light source 164 can be configured as multiple light sources, such as a laser pointer and an LED.

During operation, the user device 102 can receive image signals 152 of the workpiece 108 via the imaging device 116. In certain cases, the user may want to highlight a portion of the workpiece 108 in order to bring the portion of the workpiece 108 to the attention of the users at the second physical location 107. To control operation of the identification device 160, the user can utilize the GUI 150 and cause the user device 102 to transmit an identification signal 170 to the workstation assembly 104 via the network 106. In response to receiving the identification signal 170, the workstation device 110 is configured to adjust the operation and position of the identification device 160 relative to the workpiece 108 based upon the identification signal 170. For example, based upon the identification signal 170, the workstation device 110 can generate and transmit an operation signal 172 to the identification device 160 to turn on the light source 164 and to the gimbal 162 to adjust the position of the light generated by the light source 164 relative to the workpiece 108.

In another example, with continued reference to FIG. 4, the carriage assembly 113 can include a manipulation device 180 configured to adjust a portion of the workpiece 108. For example, the manipulator device can adjust the position of the workpiece 108 on the workspace 109 or to adjust a position or orientation of a subcomponent of the workpiece 108 at the site of the workstation assembly 104. The manipulation device 180 is disposed in electrical communication with the workstation device 110 and, as such, can be controlled remotely by the user device 102 via GUI 150. In one arrangement, the manipulation device 180 is configured as a mechanical device, such as a set of tweezers.

During operation, the user device 102 can receive image signals 152 of the workpiece 108 via the imaging device 116. In certain cases, the user may want to adjust or manipulate a portion of the workpiece 108. To control operation of the manipulation device 180, the user can utilize the GUI 150 and cause the user device 102 to transmit a manipulation signal 182 to the workstation assembly 104 via the network 106. In response to receiving the manipulation signal 182, the workstation device 110 is configured to adjust a position of the manipulation device 180 relative to the workpiece 108 based upon the manipulation signal 182. For example, based upon the manipulation signal 182, the workstation device 110 can generate and transmit an operation signal 172 to the manipulator device 180 to control operation (e.g., movement, grasping, etc.) of the manipulation device 180 relative to the workpiece 108.

With such a configuration of the collaboration system 100, a user located at a first physical location 105 can interact with a workpiece 108 located at a second physical location 107. For example, the workstation assembly 104 provides the user at the first location 105 with the ability to view the details of a workpiece 108 and to identify specific areas of focus of the workpiece 108. Accordingly, the collaboration system 100 provides effective remote collaboration on a workpiece 108 among users located in remote geographic locations.

As provided above, the user device 102 is configured to control the position of the carriage assembly 113, to view the workpiece 108. With reference to FIG. 1, the frame 112 of the workstation assembly 104 can be disposed on, or secured to a base 115, which also carries the workpiece 108. With such a configuration, as the carriage assembly 113 travels along the frame 112, the imaging device 116 is maintained in a planar travel path. Such description is by way of example only. In one arrangement, the workstation assembly 104 is configured to provide multi-planar positioning of the imaging device 116 relative to the workpiece 108. For example, with reference to FIG. 8, the frame 112 is configured to rotate relative to the workspace 109 and workpiece 108 along a direction 190 that is perpendicular to a direction of rotation 124 of the carriage assembly 113.

Figure 8:
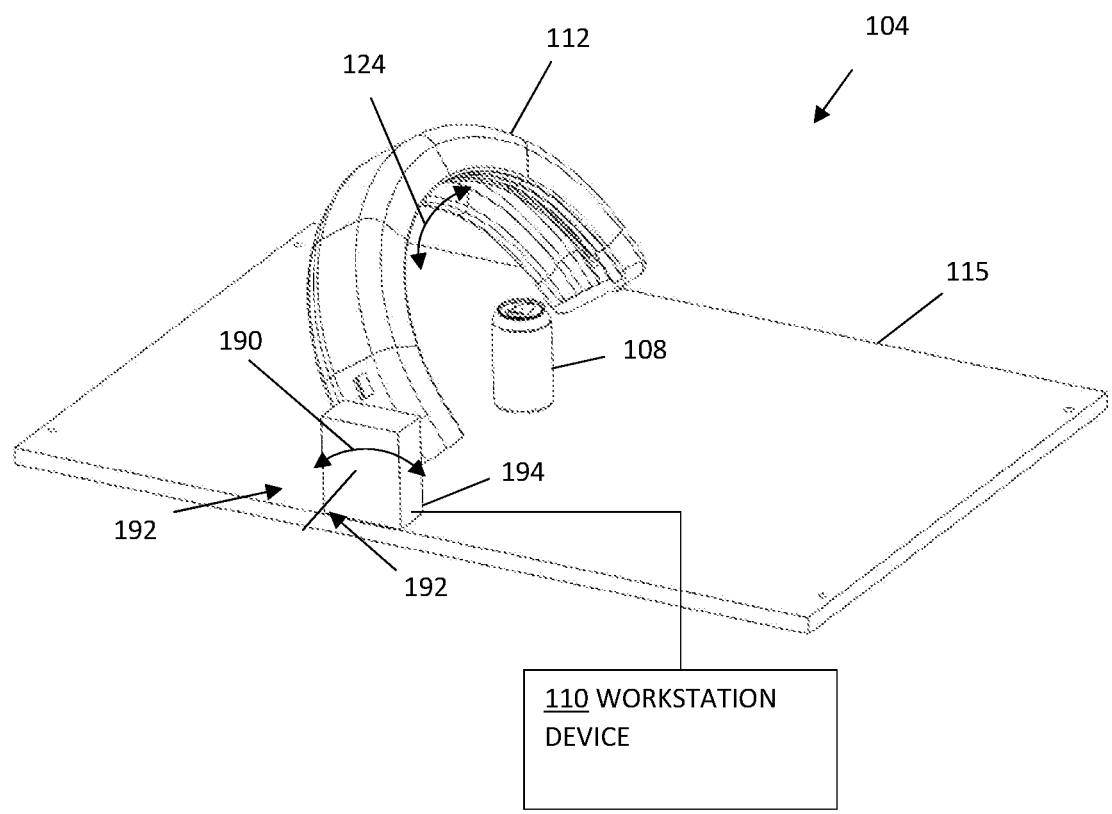
FIG. 8 illustrates a schematic representation of the workstation assembly of FIG. 2 rotating relative to a base, according to one arrangement.

For example, as illustrated in FIG. 8, the workstation assembly 104 includes a frame drive assembly 192 having a housing 194 coupled to the base 115 and a drive element (nor shown) coupled to the frame 112. While the drive element can be configured in a variety of ways, in one arrangement, the drive element is a motor drive configured to rotate the frame 112 about longitudinal axis 195 along direction 190. The frame drive assembly 192 is disposed in electrical communication with the workstation device 110 and can be controlled by the user device 102 via the GUI 150.

During operation, the user at the first physical location 105 can utilize the GUI 150 and cause the user device 102 to transmit a drive signal to the workstation assembly 104 via the network 106. In response to receiving the drive signal, the workstation device 110 is configured to control operation of the frame drive assembly 192 relative to the workpiece 108. For example, the workstation device 110 can rotate the frame 112 about longitudinal axis 195 along direction 194 to adjust the position of the frame 112 relative to the workpiece 108. Further, the workstation device 110 can adjust the position of the carriage assembly 113 along direction 124 relative to the workpiece 108 based upon a position signal 160 received from the user device 102. As such, the workstation assembly 104 can provide the remote user with a multi-planar or hemispherical view of the workpiece 108.

In one arrangement, to optimize the image signals 152 provided to the user device 102, the travel path of the carriage assembly 113 can be adjusted to correspond to the size and shape of a workpiece 108 under development. As such, the shape of the frame 112 can be modified to define a variety of geometries. For example, with reference to FIG. 3, the workstation assembly 104 can include a plurality of modular elements 200 which connect together to form the frame 112. As indicated, each modular frame element of the plurality of modular frame elements 200 can be connected to an adjacent modular frame element of the plurality of modular frame elements 200. For example, first modular frame element 202 is connected between second modular frame element 204 and third modular frame element 206.

Figure 9:
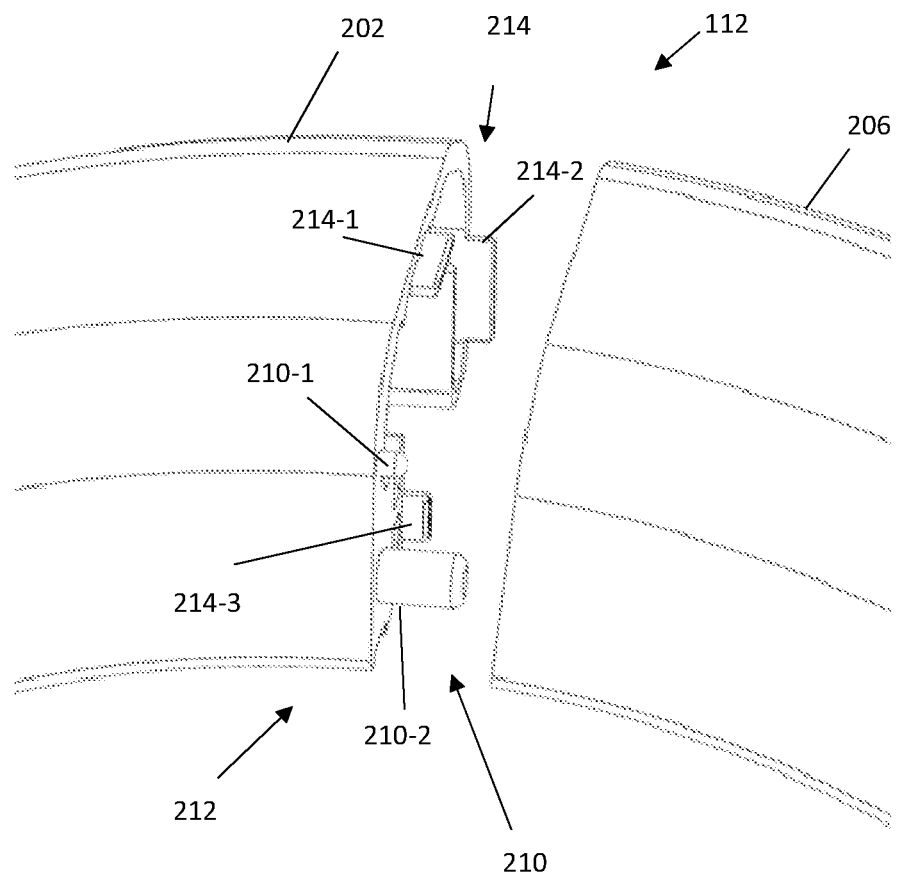
FIG. 9 illustrates a first perspective view of a connection mechanism of modular frame elements, according to one arrangement.

The modular frame elements 200 can be configured to connect together in a variety of ways. In one arrangement, with reference to FIG. 9 and taking modular frame element 202 as an example, the modular frame element 202 can include a set of guide protrusions 210 extending from a first end 212 of the modular frame element 202. For example, the modular frame element 202 can include first and second guide protrusions 210-1, 210-2 extending from the first end 212. Further, the modular frame element 202 can include a set of coupling protrusion 214, such as clips, extending from the first end 212. For example, the frame element 202 can include first, second, and third coupling protrusions 214-1 through 214-3 extending from the first end 212.

Figure 10:
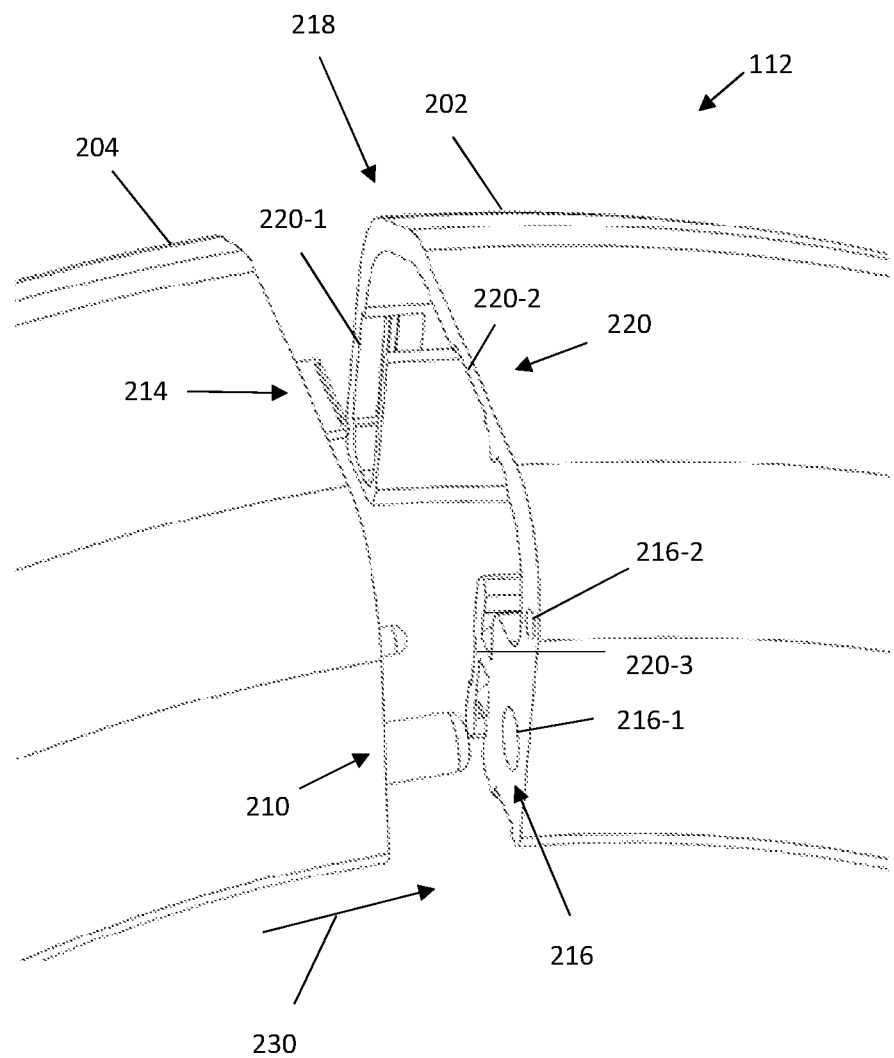
FIG. 10 illustrates a second perspective view of the connection mechanism of modular frame elements, according to one arrangement.

Additionally, with reference to FIG. 10, the modular frame element 202 can include a set of guide receptacles 216 defined by the second end 218 of the modular frame element of the modular frame element 202. For example, the modular frame element 202 can include first and second guide receptacles 216-1, 216-2 defined by the second end 218. Further, the modular frame element 202 can include a set of coupling receptacles 220 defined by the second end 218 of the modular frame element 202. For example, the frame element 202 can define first, second, and third coupling receptacles 220-1 through 220-3 defined by the second end 218.

During assembly, with reference to FIG. 10, an assembler can insert the guide protrusions of an adjacent modular frame element, in this case modular frame element 204 into the first and second guide receptacles 216-1, 216-2 defined by the second end 218 of modular frame element 202. Interaction between the guide protrusions 210 and the first and second guide receptacles 216-1, 216-2 align the frame elements 202, 204 prior to coupling. As the assembler advances the modular frame element 204 toward modular frame element 202 along direction 230, the coupling protrusions 214 insert within the corresponding coupling receptacles 220-1 through 220-3 and engage the walls of the coupling receptacles 220-1 through 220-3 with a snap fit. Such a snap fit secures the second frame element 204 to the first frame element 202.

Figure 11:
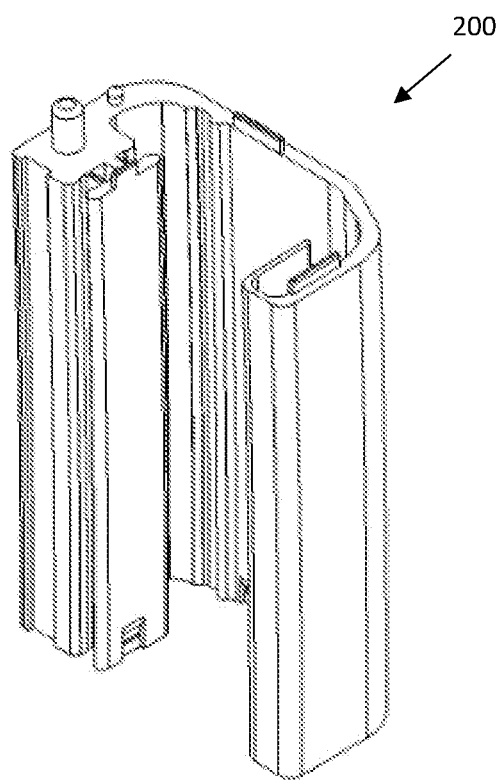
FIG. 11 illustrates a modular frame element having a linear geometry, according to one arrangement.
Figure 12:
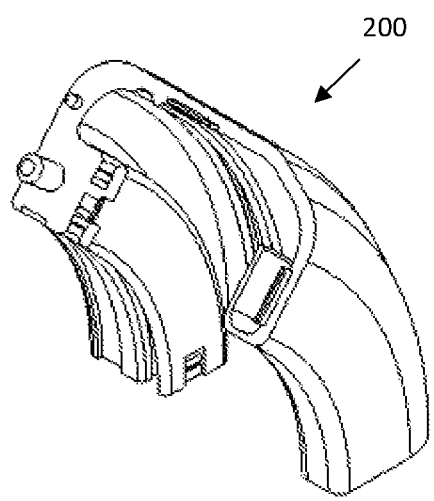
FIG. 12 illustrates a modular frame element having a curved geometry, according to one arrangement.

In order to customize the shape of the frame 112, the assembler can utilize modular frame elements 200 having a variety of shapes. For example, the modular frame elements 200 can define a linear geometry, as shown in FIG. 11, or a curved geometry, as shown in FIG. 12.

While various embodiments of the innovation have been particularly shown and described, it will be understood by those skilled in the art that various changes in form and details may be made therein without departing from the spirit and scope of the innovation as defined by the appended claims.

What is claimed is:

1. A workstation assembly, comprising:
    a frame;
    a carriage assembly moveably coupled to the frame, the carriage assembly having a carriage frame and an imaging device coupled to the carriage frame; and
    a workstation device disposed in electrical communication with the carriage assembly, the workstation device having a controller including a processor and a memory, the controller configured to:
        transmit an image signal of a workspace from the imaging device to a remote user device,
        receive a control signal from the remote user device, and
        adjust a position of the carriage assembly on the frame and relative to the workspace based upon the control signal.

2. The workstation assembly of claim 1, wherein the frame defines an arc-shape structure, the carriage assembly configured to translate on the frame relative to the workspace.

3. The workstation assembly of claim 2, wherein the frame is configured to rotate relative to the workspace along a direction that is perpendicular to a direction of rotation of the carriage assembly.

4. The workstation assembly of claim 3, wherein the frame is rotatably coupled to a base, a workpiece carried by the base.

5. The workstation assembly of claim 1, wherein the frame comprises a plurality of modular frame elements, each modular frame element of the plurality of modular frame elements connected to an adjacent modular frame element of the plurality of modular frame elements.

6. The workstation assembly of claim 5, wherein a modular frame element of the plurality of modular frame elements defines one of a linear geometry and a curved geometry.

7. The workstation assembly of claim 5, wherein a modular frame element of the plurality of modular frame elements comprises:
    at least one guide protrusion extending from a first end of the modular frame element and at least one coupling protrusion extending from the first end of the modular frame element; and
    at least one guide receptacle defined by the second end of the modular frame element and at least one coupling receptacle defined by the second end of the modular frame element, the at least one guide protrusion configured to be disposed within the at least one guide receptacle and the at least one coupling protrusion configured to be disposed within the at least one coupling receptacle.

8. The workstation assembly of claim 1, further comprising a manipulation device configured to adjust a portion of a workpiece, the manipulation device coupled to the carriage assembly and disposed in electrical communication with the workstation device, the workstation device configured to:
  receive a manipulation signal from the remote user device, and
  adjust a position of the manipulation device relative to the workpiece based upon the manipulation signal.

9. The workstation assembly of claim 1, further comprising an identification device configured to identify an area of the workpiece, the identification device coupled to the carriage and disposed in electrical communication with the workstation device, the workstation device configured to:
  receive an identification signal from the remote user device, and
  adjust a position of the identification device relative to the workpiece based upon the identification signal.

10. The workstation assembly of claim 9, wherein the identification device comprises a light source.

11. A collaboration system, comprising:
  a remote user device having a processor and a memory; and
  a workstation assembly disposed in electrical communication with the remote user device the workstation assembly comprising:
    a frame;
    a carriage assembly moveably coupled to the frame, the carriage assembly having a carriage frame and an imaging device coupled to the carriage frame; and
    a workstation device disposed in electrical communication with the carriage assembly, the workstation device having a controller including a processor and a memory, the controller configured to:
      transmit an image signal of a workspace from the imaging device to the remote user device,
      receive a control signal from the remote user device, and
      adjust a position of the carriage assembly on the frame and relative to the workspace based upon the control signal.

12. The collaboration system of claim 11, wherein the frame defines an arc-shape structure, the carriage assembly configured to translate on the frame and relative to the workspace.

13. The collaboration system of claim 12, wherein the frame is configured to rotate relative to the workspace along a direction that is perpendicular to a direction of rotation of the carriage assembly.

14. The collaboration system of claim 13, wherein the frame is rotatably coupled to a base, the workpiece carried by the base.

15. The collaboration system of claim 11, wherein the frame comprises a plurality of modular frame elements, each modular frame element of the plurality of modular frame elements connected to an adjacent modular frame element of the plurality of modular frame elements.

16. The collaboration system of claim 15, wherein a modular frame element of the plurality of modular frame elements defines one of a linear geometry and a curved geometry.

17. The collaboration system of claim 15 wherein a modular frame element of the plurality of modular frame elements comprises:
  at least one guide protrusion extending from a first end of the modular frame element and at least one coupling protrusion extending from the first end of the modular frame element; and
  at least one guide receptacle defined by the second end of the modular frame element and at least one coupling receptacle defined by the second end of the modular frame element, the at least one guide protrusion configured to be disposed within the at least one guide receptacle and the at least one coupling protrusion configured to be disposed within the at least one coupling receptacle.

18. The collaboration system of claim 11, further comprising a manipulation device configured to adjust a portion of a workpiece, the manipulation device coupled to the carriage assembly and disposed in electrical communication with the workstation device, the workstation device configured to:
  receive a manipulation signal from the remote user device, and
  adjust a position of the manipulation device relative to the workpiece based upon the manipulation signal.

19. The collaboration system of claim 11, further comprising an identification device configured to identify an area of a workpiece, the identification device coupled to the carriage assembly and disposed in electrical communication with the workstation device, the workstation device configured to:
  receive an identification signal from the remote user device, and
  adjust a position of the identification device relative to the workpiece based upon the identification signal.

20. The collaboration system of claim 19, wherein the identification device comprises a light source.

* * * * *